United States Patent [19]

Nadeau

[11] Patent Number: 5,393,479
[45] Date of Patent: Feb. 28, 1995

[54] METHOD FOR SHAPING A TRIM COVER FABRIC FOR A VEHICLE SEAT

[75] Inventor: Phillip H. Nadeau, Waterford, Mich.

[73] Assignee: Hoover Universal, Inc., Plymouth, Mich.

[21] Appl. No.: 68,475

[22] Filed: May 27, 1993

[51] Int. Cl.[6] .................. B29C 43/52; B29C 43/18
[52] U.S. Cl. ......................... 264/219; 264/257; 264/324; 425/394; 425/407; 425/411
[58] Field of Search ............ 264/46.4, 46.8, 219, 264/257, 324, 546; 425/406, 394, 411, 407; 156/221, 214, 219, 245, 285

[56] References Cited

U.S. PATENT DOCUMENTS

| | | | |
|---|---|---|---|
| 4,080,416 | 3/1978 | Howard | 264/324 |
| 4,795,517 | 1/1989 | Elliott et al. | 156/221 |
| 4,844,761 | 7/1989 | Bracesco | 425/406 |
| 4,860,415 | 8/1989 | Witzke | 156/90 |
| 4,861,543 | 8/1989 | Rafferty | 264/46.8 |
| 4,975,135 | 12/1990 | Lowe | 156/155 |
| 5,000,805 | 3/1991 | Lowe | 29/91.1 |
| 5,015,169 | 5/1991 | Inzinna et al. | 425/394 |
| 5,107,576 | 4/1992 | Rohn | 264/46.8 |

Primary Examiner—Jay H. Woo
Assistant Examiner—Duane S. Smith
Attorney, Agent, or Firm—Leonard Kalinowski; E. L. Levine; Joseph E. Root, III

[57] ABSTRACT

A method for shaping a trim cover fabric for the entire front surface of a vehicle seat back portion or the entire top surface of a vehicle seat cushion portion, includes providing a forming tool having a forming surface with a portion complementary to a basic shape to be provided for the seat surface and a portion defining a cavity; providing a plurality of style line inserts, different ones of the style line inserts having different styling surfaces that are complementary to different desired stylized shapes to be provided for the seat surface; selecting one of the style line inserts and inserting the selected style line insert into the cavity; positioning the trim cover fabric on the forming tool assembly; providing a pressing tool having a surface formed to be complementary to the forming surface of the forming tool and the styling surfaces of the plurality of style line inserts to enable the pressing tool to be used with a forming tool assembly that includes any of the style line inserts; and pressing the cover fabric onto the forming tool assembly using the pressing tool to provide the desired stylized shape for the trim cover fabric.

7 Claims, 4 Drawing Sheets

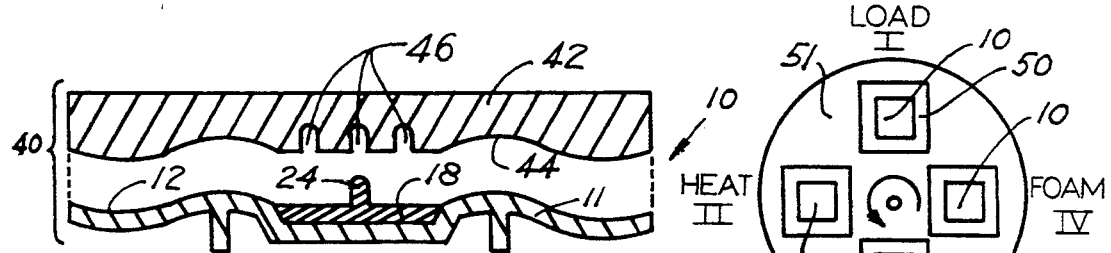
FIG.6
FIG.7
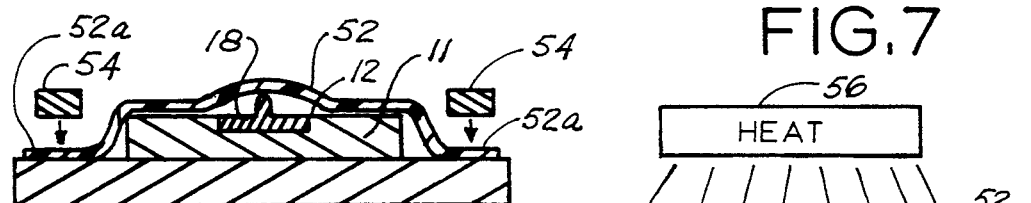
FIG.8
FIG.9
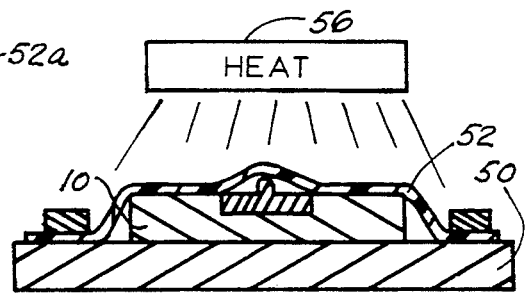
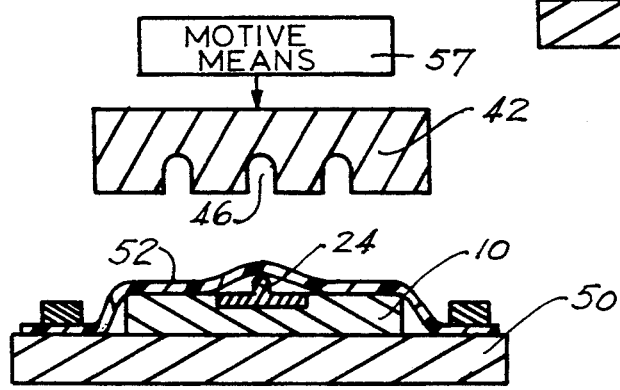
FIG.10
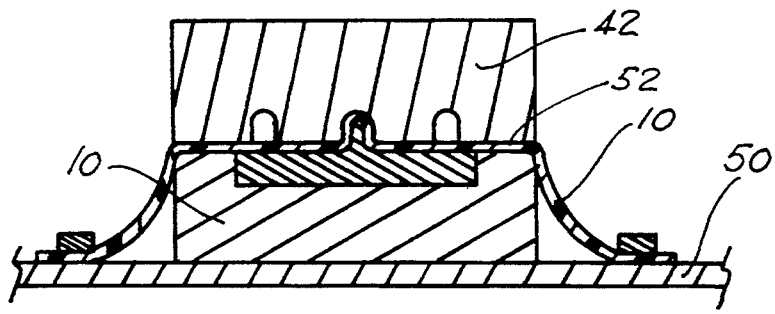
FIG.11

METHOD FOR SHAPING A TRIM COVER FABRIC FOR A VEHICLE SEAT

BACKGROUND OF THE INVENTION

This invention relates to vehicle seat assemblies, and more particularly, to a forming tool including a removable style line insert for use in producing vehicle seat trim covers.

Typically, in the production of vehicle seat trim covers, forming tools are constructed and used which have a surface contour which is complementary to the final desired shape of the vehicle seat or back. One exile of such forming tools is disclosed in U.S. Pat. No. 4,860,415, entitled "Vehicle Seat Assembly With Pour In Place For Body," which was issued Aug. 29, 1989, In the process disclosed in this patent, material for a vehicle seat cover is placed inside out on a forming tool which has the desired complementary contours to the finished product. The material is shaped to the contours of the forming tool by vacuum forming. Another known method for producing vehicle seat assemblies uses complementary shaped forming tools. The seat cover material is shaped by pressing the material between the complementary shaped forming tools under conditions of heat and pressure. In both methods, the forming tools must be individually made with the desired surface contours. Consequently, any small change in the styling detail requires a completely new forming tool or set of forming tools that incorporates the final shape for the vehicle seat being produced. Moreover, changing a forming tool or forming tool set is a relatively difficult procedure because the forming tools are large and bulky and are relatively heavy. Also, when the cover fabric is shaped by pressing it between complementary forming tools, the forming tools are heated to a temperature of about 230 degrees Fahrenheit. Consequently, special procedures are required for handling the forming tools during a changeover. In addition, when complementary forming tools are used, a tooling changeover requires that both of the forming tools be replaced and so the forming tools must be realigned with one another during the retooling operation.

Forming tools having removable inserts which permit modification of the insert instead of replacement of the entire forming tool are described in U.S. Pat. No. 4,975,135 issued on Dec. 4, 1990. The forming tools described in this patent allow interchange of styles for producing vehicle seat covers having differing contours as consumer demand dictates. However, the insert is used in shaping substantially the entire "A" surface of the vehicle seat, that is about 80% of the "A" surface. Because the insert in itself defines nearly all of the forming surface for the forming tool, the insert, albeit a generally flat plate, is nearly as large as the forming tool with which it is assembled. In one method disclosed in this patent, vacuum forming is used to draw the cover fabric onto the forming tool to shape the cover fabric to the desired shape. However, this requires vacuum connections to the forming tool which limits automation of this process for shaping seat cover fabric. In another process disclosed in this patent, complementary forming tools are used and the cover fabric is pressed between the two complementary forming tools under conditions of heat and pressure. In this process, both forming tools require a style insert and both inserts must be changed whenever a style line change is called for.

SUMMARY OF THE INVENTION

The present invention provides a trim cover forming tool for use in producing trim covers for vehicle seats, and in particular, the trim covers for the portion of the vehicle seat that is commonly referred to as the "A" surface. The forming tool is made of a standardized design and is adapted to receive different style line inserts to produce a vehicle seat trim cover having different style lines. The style line inserts permit changing the common shape of the forming tool to provide different style lines without replacing the basic forming tool or removing the forming tool from the production line.

The forming tool has a contoured upper forming surface of a basic shape that is common to a plurality of seat trim cover designs. The upper surface of the forming tool includes a cavity for receiving different style line inserts which incorporate correspondingly different styling details to be provided by the forming tool. The style line inserts are generally rectangular in shape and have the same length and width, which dimensions correspond to the dimensions of the cavity in the surface of the forming tool. However, each style line insert has an upper style surface which is unique to that style line insert. The contoured surface of the forming tool forms the basic shape for the surface of the vehicle seat cover being formed and the style line insert forms the individually styled portion of this surface. The style line insert forms only a small portion of the "A" surface, and therefore, represents only a small portion of the forming tool upper surface, typically about 8% to 15% of the forming tool surface. Thus, the style line insert is small as compared to the basic forming tool and, for example, weighs only about two to three pounds. Consequently, style line changes are made simpler because of the relatively small size and weight of the style line insert. Moreover, replacement of the style line insert is readily accomplished, even when the style line insert is hot as will be the case when a style line change is required on a working production line. Typically, the forming tool is heated to a temperature greater than 220 degrees F.

In accordance with the present invention, the forming tool with style line inserts is used with a pressing tool which is disposed in overlying relationship therewith and is adapted to be moved downwardly into engagement with the forming tool. The pressing tool has a lower surface that is complementary to the upper forming surface of the forming tool and bears a styling surface that is generic or common to all of the style lines provided by the different style line inserts which are useable with the forming tool set. Thus, the pressing tool does not have to be modified when a style line change is made. In addition, because only the style line insert is changed, there is no need to realign the forming tool with the pressing tool whenever a style line change is made. The basic forming tool is not removed and so when a replacement style line insert is positioned in the cavity of the forming tool, the replacement style line insert is automatically aligned with the upper tool.

In accordance with one process provided by the present invention for shaping fabric covers for vehicle seats, the forming tool with the cover fabric thereon is preheated. Then, the pressing tool, which is unheated, is lowered onto the preheated forming tool to press the cover fabric into the shape of the forming tool. This preheating of the forming tool and the cover fabric simplifies the fabric shaping process and apparatus because the pressing tool does not have to be heated during the forming process. In another process in accordance with the present invention, the pressing tool is preheated and is then lowered onto the unheated forming tool to press the cover fabric into the shape of the forming tool. In both processes, the tool which is preheated is heated from a remote source and no connections are required to supply heat either to the forming tool or the pressing tool.

DESCRIPTION OF THE DRAWINGS

FIG. 6 is a simplified representation of a forming tool set which includes the forming tool of FIG. 1 and a complementary pressing tool for forming trim covers for vehicle seats;

FIG. 7 is a simplified representation of a multi-station apparatus for producing a vehicle seat using the forming tool set provided by the present invention;

FIG. 8 is a simplified representation of the first station of the apparatus of FIG. 7, illustrating the cover fabric being positioned on the forming tool;

FIG. 9 is a simplified representation of the second station of the apparatus of FIG. 7, illustrating heating of the forming tool and the cover fabric thereon;

FIG. 10 is a simplified representation of the third station of the apparatus of FIG. 7, illustrating the pressing tool prior to being lowered onto the heated cover fabric;

FIG. 11 is a view similar to FIG. 10, but illustrating the pressing tool lowered into position for pressing the heated cover fabric onto the forming tool;

DESCRIPTION OF A PREFERRED EMBODIMENT

Figure 1:
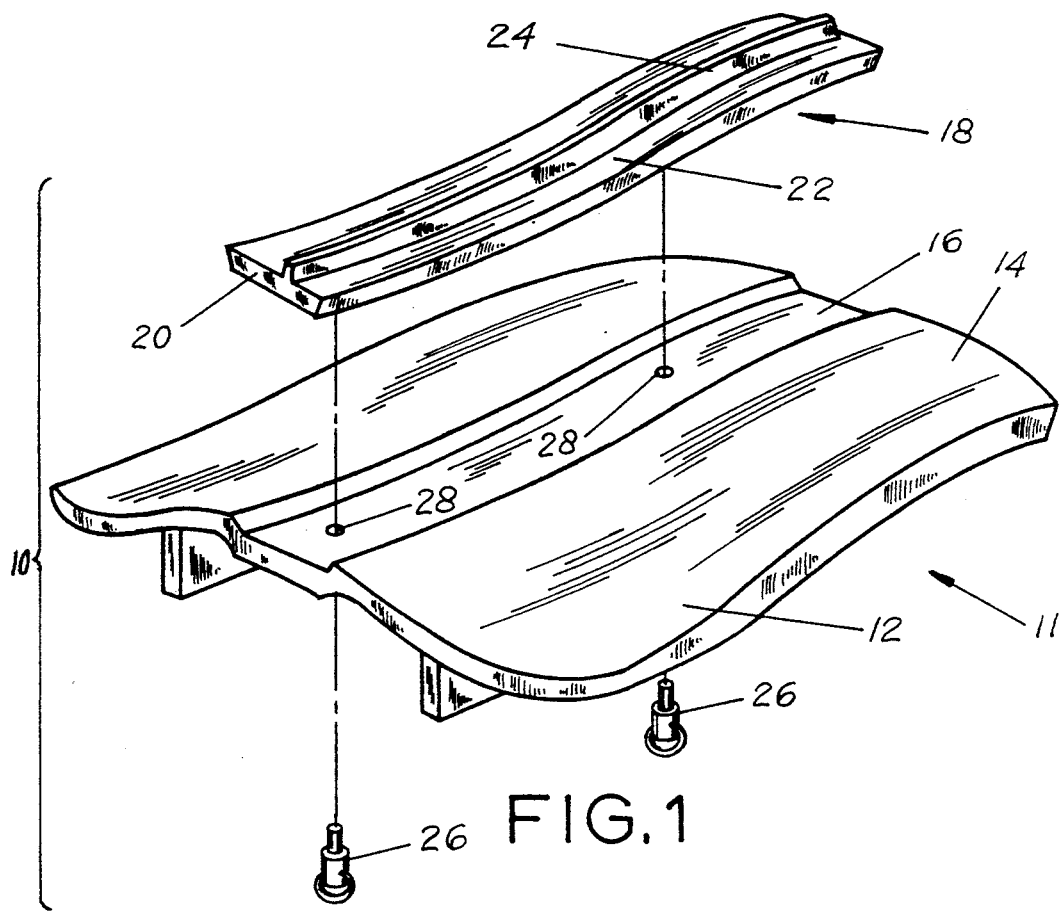
FIG. 1 is an exploded perspective view of one forming tool including a removable style line insert provided by the present invention.
Figure 2:
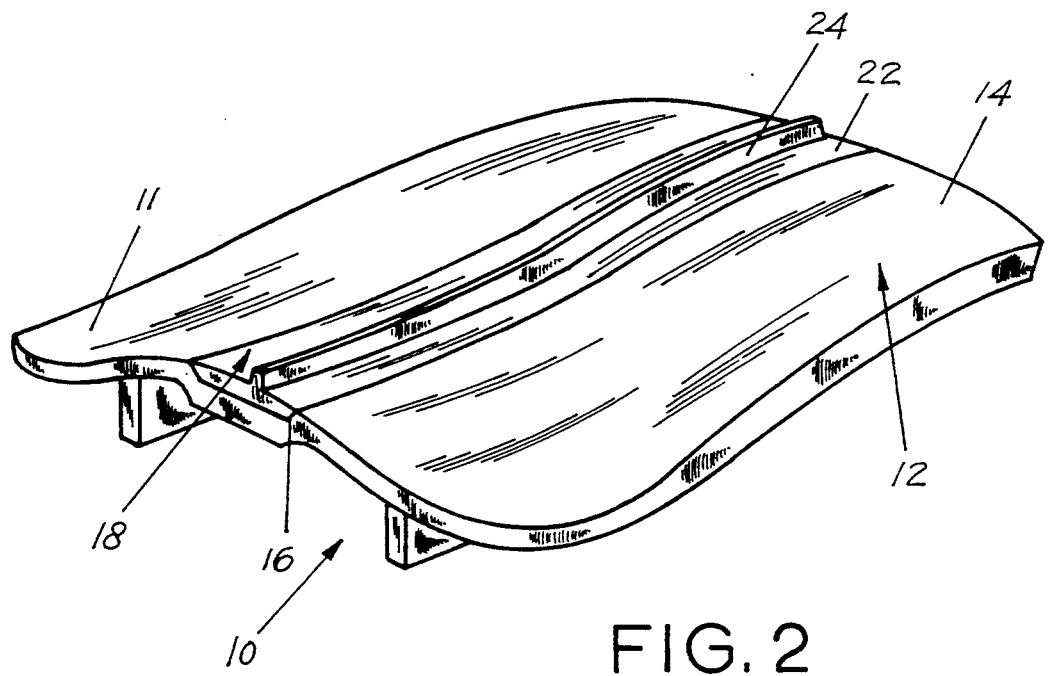
FIG. 2 is an assembled perspective view of the forming tool of FIG. 1.

Referring to FIGS. 1 and 2, one forming tool assembly 10 provided by the present invention includes a forming tool 11 having a main body portion 12 having a contoured upper surface 14. The upper surface 14 includes a slot or cavity 16 which is adapted to receive a style line insert 18. The cavity 16, which is generally rectangular in shape, extends the length of the forming tool and has a predetermined length, width and depth. Typically, the forming tool is about twenty-four inches wide and the cavity 16 is about two inches wide. The style line insert 18 has a rectangular mounting portion 20 which is shaped and dimensioned to fit into the cavity 16. Thus, for a typical forming tool, the width of the style line insert 18 is about two inches and the style line insert extends the length of the forming tool and thus forms about 8% to 15% of the total upper surface area of the forming tool. Although larger sized style line inserts could be used, the area of the style line insert forms less than about 40%, and typically about 8% to 15% of the total upper surface area of the forming tool. The style line insert 18 has a shaped upper surface 22 and a styling pattern 24 which forms a unique styling pattern for the forming tool 11. For the embodiment illustrated in FIGS. 1 and 2, the styling pattern 24 is a single rib. When the style line insert 18 is located in the cavity 16, the shaped upper surface 22 is flush with the contoured upper surface 12 of the forming tool and the styling pattern 24 projects beyond the cavity 16. The style line insert is maintained in the cavity by one or more quick release pins or screws 26 which extend through apertures 28 in the main body portion of the forming tool and are threaded into holes (not shown) in the bottom surface of the style line insert.

The forming tool assembly 10 is used in the production of seat trim covers for vehicle seats, and in particular, in forming a portion of the seat trim cover to a predetermined shape. The portion of the seat trim cover that is shaped is the face of the seat cover that engages the seating load, i.e., the top surface of the seat cushion and the front surface of the seat back. This surface is referred to as the "A" surface. The contoured upper surface 14 of the forming tool 11 forms the basic shape for the seat cover being produced and the style line insert 18 forms the individually styled portion of the "A" surface of the vehicle seat. Because the style line insert forms only a small portion of the "A" surface, the style line insert makes up only a small portion of the forming tool upper style surface, typically about 8% to 10%, and thus shapes only about 8% to 10% of the formed surface of the seat trim cover. The style line insert 18 is small as compared to the basic forming tool 11 and weighs only about two to three pounds.

Figure 3:
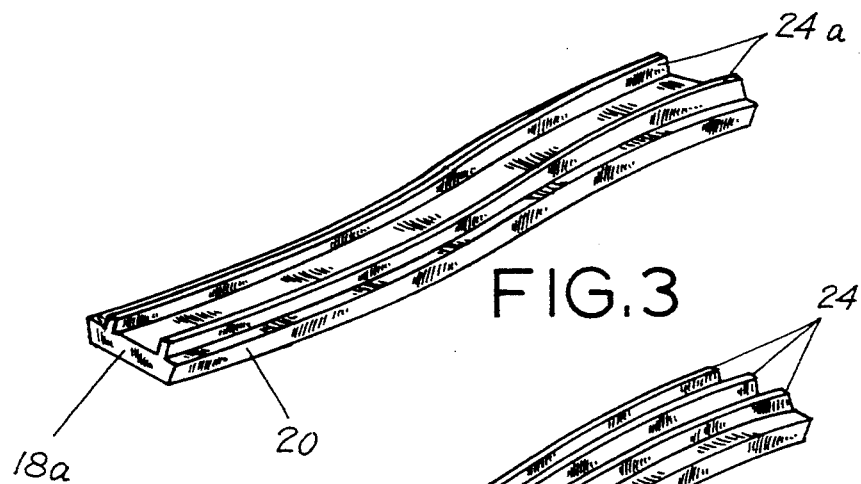
FIG. 3 is a perspective view of another embodiment of a style line insert for the forming tool of FIG. 1.
Figure 4:
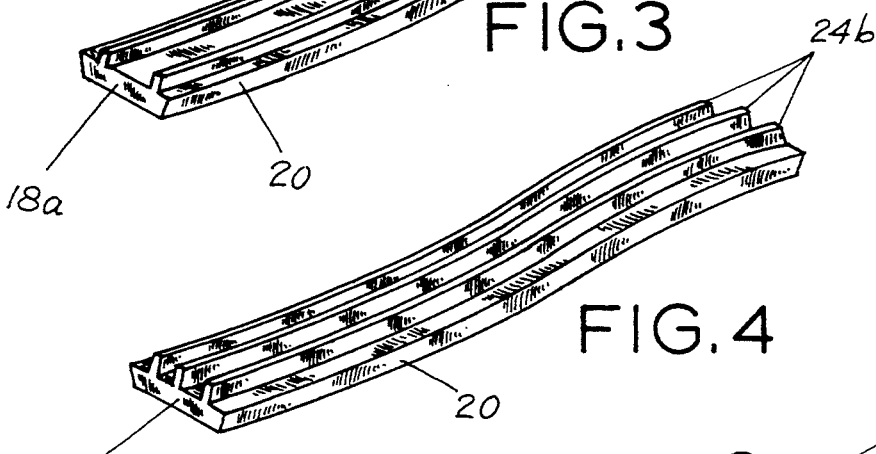
FIG. 4 is a perspective view of another embodiment of a style line insert for the forming tool of FIG. 1

Referring to FIGS. 1, 3 and 4, other style line inserts 18a and 18b are adapted to be mounted on the forming tool 11. The style line inserts 18, 18a and 18b all have the same dimensions as to their mounting portions 20, but have a different styling portion 24, 24a and 24b, respectively. In the embodiments illustrated, the styling portions include a single rib 24 for style line insert 18, a double rib 24a for style line insert 18a, and three ribs 24b for style line insert 18b.

Figure 5:
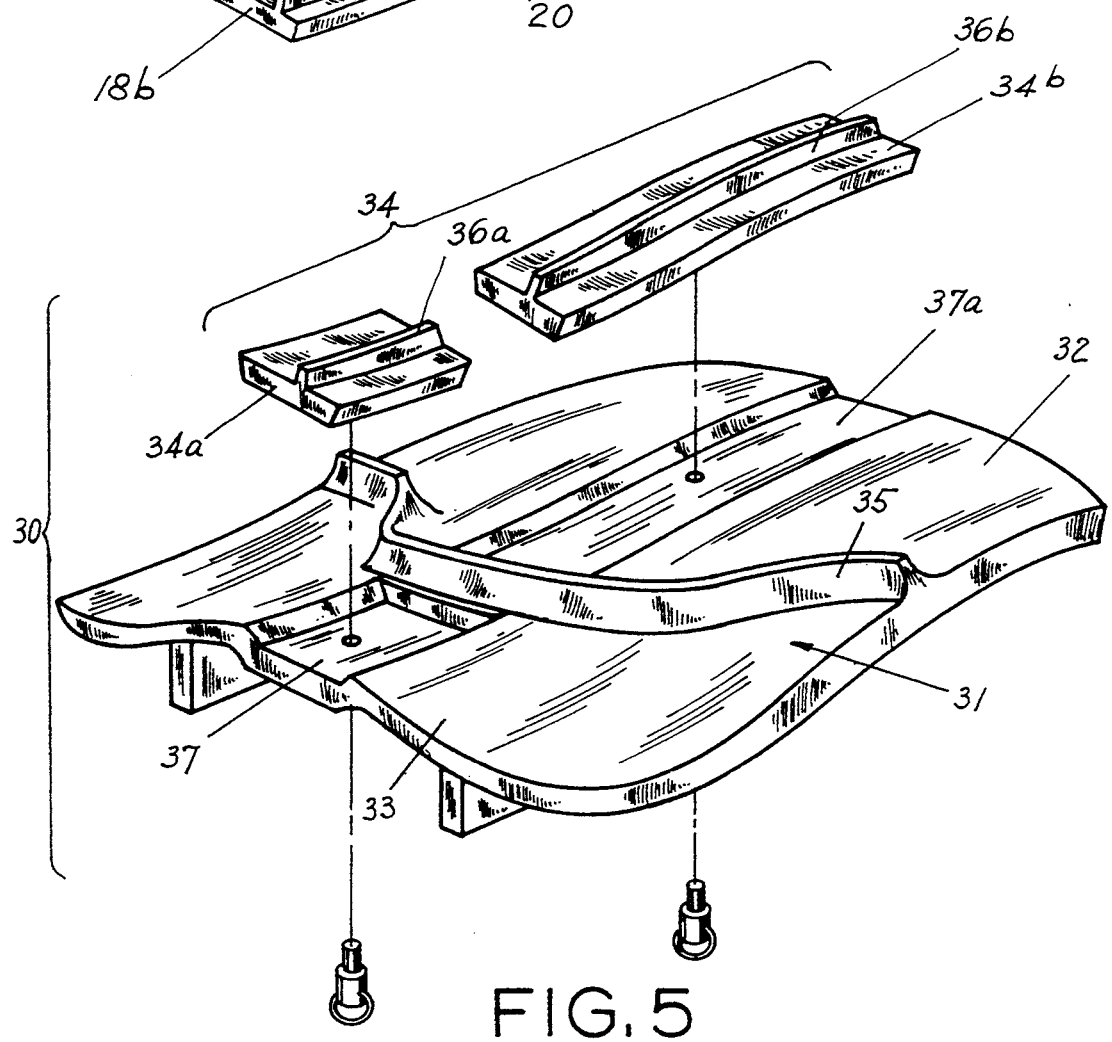
FIG. 5 is a perspective view of a further embodiment of a forming tool including a removable style line insert provided by the present invention.

Referring to FIG. 5, in accordance with another embodiment of the invention, a forming tool assembly 30 includes a forming tool 31 having a main body portion 32 having a contoured upper surface 33 which defines a portion 35 of the styling surface and a two-part style line insert 34 which defines the balance of the styling surface. In the embodiment illustrated in FIG. 5, portion 35 of the styling surface 33 comprises a rib which extends transverse to the main body portion of the forming tool. The style line insert 34 includes parts 34a and 34b which are shaped and dimensioned to be received in complementary shaped cavities 37 and 37a in the upper surface 33. The parts 34a and 34b of the style line insert define respective portions 36a and 36b of a styling rib which extends normal to the raised rib portion 35 of the main body portion 32. Other two-part style line inserts can be provided having different style lines, such as two or three ribs similar to style line inserts 18a and 18b illustrated in FIGS. 3 and 4. Moreover, although the inserts 18, 18a and 18b are illustrated as extending vertically or from front to back in the finished seat assembly, such inserts may extend transversely or side to side in the finished seat assembly.

Referring to FIGS. 1, 2 and 6, the forming tool assembly 10 is one element of a forming tool set 40 which is used in forming trim covers for vehicle seats. The forming tool 11 is adapted to receive different style line inserts, such as style line insert 18. The forming tool set 40 additionally includes a complementary shaped pressing tool 42. The pressing tool 42 is mounted in overlying relationship with forming tool assembly 10 and is adapted to be moved downwardly into engagement with forming tool assembly 10. The pressing tool 42 has a lower surface 44 that is complementary to the upper surface 12 of forming tool 10 and is generic to all of the style lines provided by the different style line inserts 18, 18a, 18b which are useable with the forming tool set 40 in the exemplary embodiment. That is, the styling surface 44 of the pressing tool 42 has a contour that is complementary to the surface 12 of forming tool 11 and has three grooves 46 which are disposed to be aligned with rib 24, ribs 24a or ribs 24b, depending on which style line insert is mounted on the forming tool 11. The forming tool set 40 includes a single forming tool 11 which is adapted to receive a plurality of different removable style line inserts which facilitate styling changes and a common pressing tool 42 which does not have to be modified when a style line change is made. To change a style line, it is necessary only to remove the style line insert from the forming tool and replace it with the style line insert that will provide the new styling. It is apparent that changing of a single small style line insert is easily accomplished as compared to changing both the forming tool and the pressing tool. Because only the style line insert 18 is changed when a style line change is ordered, there is no need to realign the forming tool 11 with the pressing tool 42 of the forming tool set 40 when a style line change is made.

Referring to FIG. 7, the manner in which the forming tool set 40 is used in forming cover fabrics for vehicle seat assemblies is described in connection with a multi-station process for producing vehicle seat assemblies. The process is carried at four positions or stations I through IV which are spaced 90 degrees apart. The forming tool assembly 10 is mounted on a suitable support 50, which in turn is mounted on a rotatable turntable 51. The turntable 51 is rotated, counterclockwise as illustrated in FIG. 7, to move the forming tool assembly 10 sequentially from position I to position IV. Typically, two such forming tool assemblies 10, commonly are used to enable a seat and a seat back to be produced for a single seat assembly at the same time. The complementary generic pressing tool 42 (or two such pressing tools 42, when two forming tool assemblies 10 are used) is located at station III (FIGS. 10-12) as will be described.

Referring to FIGS. 8-15, in use of the apparatus, at the first station I, a cover fabric 52 is placed on the forming tool assembly 10, engaging the upper surface 12 of the forming tool assembly 10 as shown in FIG. 8. The forming tool assembly includes the style line insert 18 providing the desired style line. The cover fabric is stretched tight and the edges 52a of the cover fabric 52 are clamped to the support 50 by suitable fixtures 54.

Then, the rotatable turntable 51 is rotated 90 degrees and indexed at station II which is shown in FIG. 9. The forming tool assembly and the cover fabric 52 are preheated to a temperature in the range of about 210 to 230 degrees F. by heat from a heat source 56. The heat source 56 may be infrared heat lamps or the like. The type of heat source used and the temperature to which the cover fabric is heated are a function of the cover fabric being shaped.

Figures 12, 13:
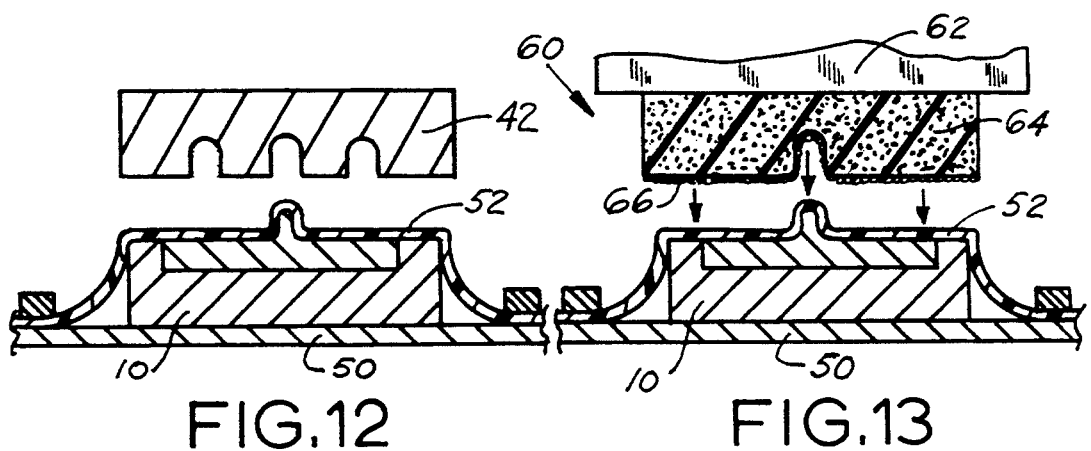
FIG. 12 is a view similar to FIG. 11, but illustrating the pressing tool retracted, showing the cover material formed with the style of the forming tool.
FIG. 13 is a simplified representation of the fourth station of the apparatus, illustrating a foam bun in overlying relation with the formed cover fabric on the forming tool.

After a preestablished process time which allows the forming tool and the cover fabric to be heated to the desired temperature, the turntable 51 is rotated 90 degrees and the forming tool assembly 10 is indexed in underlying relation with the pressing tool 42 at station III which is illustrated in FIGS. 10-12. The pressing tool 42, which is unheated, is lowered by a suitable motive means 57 into engagement with the cover fabric on the forming tool assembly 10 as shown in FIG. 11. The pressing tool 42 presses the cover fabric into conformity with the contours of the forming tool assembly 10. The pressing tool is maintained in engagement with the cover fabric mounted on the forming tool for 30 to 50 seconds, and preferably for approximately 35 to 45 seconds. The cover fabric is pressed into conformity with the style lines on the forming tool by the complementary shaped pressing tool 42. The pressing tool 42 is then retracted, separating the forming tool and the pressing tool while retaining the formed cover fabric 52 on the forming tool assembly 10 as shown in FIG. 12. It is pointed out that in the preferred embodiment, the forming tool and the cover fabric are preheated and the pressing tool is unheated. In accordance with an alternative process in accordance with the invention, the pressing tool is preheated and the step of preheating the forming tool and cover fabric is eliminated. The pressing tool is heated sufficiently to form the cover fabric into the shape of the forming tool, which is unheated, when the pressing tool is lowered into engagement with the cover fabric.

Figures 14, 15:
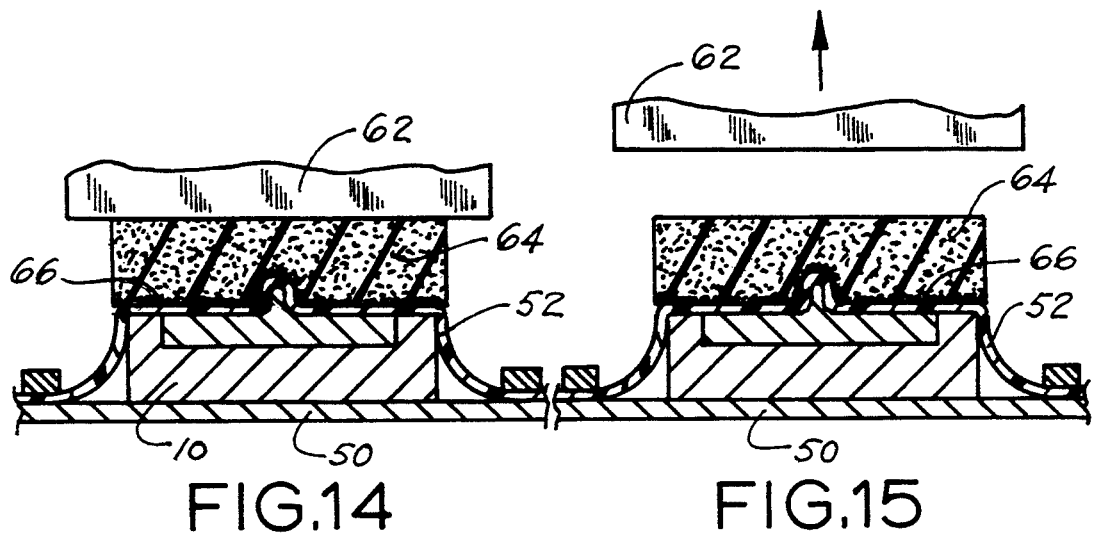
FIG. 14 is a view similar to FIG. 13, but illustrating the foam bun applied to the formed cover fabric; and, FIG. 15 is a view similar to FIG. 14, but illustrating the foam bun released from the holder, which is shown retracted, and illustrating the completed seat portion on the forming tool.

When the cover fabric has been formed into the desired shape, the turntable 51 is rotated 90 degrees and the forming tool is indexed at station IV which is illustrated in FIG. 13-15. A support apparatus 60 at station IV includes a support 62 which supports a foam cushion or bun 64 to which the formed cover fabric 52 is to be secured. The support apparatus 60 includes a suitable motive means for lowering the support 62 to carry the foam bun 64 into position on the formed cover fabric 52 on forming tool 10. The foam bun 64 is premolded to have a surface 65 with the precise or exact image of the stylized shape of the portion of the vehicle seat being formed. The shaped surface 65 of the foam bun is spray coated with a suitable adhesive 66 over substantially its entire surface 65 to bond the formed cover fabric 52 to the foam bun 64. The support 62 is moved downwardly to lower the adhesive coated foam bun 64 onto the formed cover fabric 52 as shown in FIG. 14. The support 62 presses the foam bun 64 into firm contact with the formed cover fabric 52 under heat and pressure to bond and secure the cover fabric 52 to the foam cushion 64.

The support 62 releases the foam bun 64 and is then retracted as shown in FIG. 15. The cover fabric 52 is unclamped from the support 50 and the formed seat portion is removed from the forming apparatus for finishing. After the formed seat portion has been removed from the apparatus, the turntable is rotated another 90 degrees back to the initial station I and the process is repeated. It is apparent that the process is continuous and that four seat portions or pairs of seat portions are being produced at the same time, with each of the seat portions being in a different stage of production at any given time.

Thus, it can be seen that the present invention provides a trim cover forming tool assembly for use in producing trim covers for vehicle seats. The forming tool assembly includes a forming tool of a standardized design and which is adapted to receive different style line inserts to produce a vehicle seat trim cover having different style lines in its contoured upper surface. The style line inserts permit changing the common shape of the forming tool to provide different style lines without replacing the basic forming tool or removing the forming tool from the production line. The contoured surface of the forming tool forms the basic shape for the seat cover being produced and the style line insert forms the individually styled portion of the surface of the vehicle seat. Because the style line insert forms only a small portion of the surface, the style line insert provides a small portion of the forming tool upper style surface, typically about 8% to 10% of the forming tool styling surface and shapes only about 8% to 10% of the surface of the seat cover. Thus, the style line insert is small in size and weight as compared to the basic forming tool. Consequently, style line changes are made simpler. In accordance with the invention, in shaping the cover fabric, the fabric is pressed between the forming tool and a pressing tool which has a styling surface that is complementary to the upper surface of the forming tool and generic to all of the style lines provided by the different style line inserts useable with the forming tools. Because the styling surface of the pressing tool is generic to all style lines, the pressing tool does not have to be modified when a style line change is made.

I claim:

1. A method for shaping a trim cover fabric for covering an "A" surface of a vehicle seat, comprising the steps of:
   providing a forming tool which has a forming surface including a first portion that is complementary to a basic shape to be provided for said surface of said seat and a second portion defining a cavity;
   providing a plurality of style line inserts which are individually useable with said forming tool, different ones of said style line inserts having different styling surfaces that are complementary to different desired stylized shapes to be provided for said surface of said seat;
   selecting one of said style line inserts;
   inserting the selected style line insert into said cavity in said forming surface of said forming tool to provide a forming tool assembly having a contoured upper surface including a portion defined by said forming tool which is complementary to a basic shape for said surface of said seat and an individually stylized portion defined by said selected style line insert which is complementary to a desired stylized shape for said surface of said seat;
   positioning said trim cover fabric on said forming tool assembly;
   providing a pressing tool which has a lower surface which is formed to be complementary to said forming surface of said forming tool and said styling surfaces of said plurality of style line inserts to enable said pressing tool to be used with a forming tool assembly that includes any style line insert of said plurality of style line inserts;
   and pressing said cover fabric onto said forming tool assembly using said pressing tool to provide the desired stylized shape for the trim cover fabric.

2. The method according to claim 1, including
   changing said forming tool assembly by removing said selected insert from said cavity;
   selecting a different one of said style line inserts which are individually useable with said forming tool;
   inserting said different selected style line insert into said cavity in said forming tool;
   and using said pressing tool, unchanged, with said different style line insert to shape a further trim cover fabric and provide a different stylized shape for said further trim cover fabric.

3. The method according to claim 1, including
   the step of heating said forming tool assembly with said cover fabric thereon to a temperature within a range of temperatures,
   and wherein said pressing tool is unheated during said pressing operation.

4. The method according to claim 1, including the step of heating said pressing tool, and wherein said forming tool assembly is unheated during said pressing operation.

5. A method for shaping a trim cover fabric for covering an "A" surface of a vehicle seat, comprising the steps of:
   providing a forming tool which has a forming surface including a first portion that is complementary to a basic shape to be provided for said surface of said seat and a second portion defining a cavity;
   providing a plurality of style line inserts which are individually useable with said forming tool, different ones of said style line inserts having a styling surface that are complementary to different desired stylized shapes for said surface of said seat;
   selecting one of said style line inserts;
   inserting the selected style line insert into said cavity in said forming surface of said forming tool to provide a forming tool assembly having a contoured upper surface including a portion defined by said forming tool which is complementary to a basic shape for said surface of said seat and an individually stylized portion defined by said selected style line insert which is complementary to a desired stylized shape for said surface of said seat;
   positioning said trim cover fabric on said forming tool assembly;
   heating said forming tool assembly and said cover fabric positioned thereon to a temperature within a range of temperatures;
   providing a pressing tool which has a lower surface which is formed to be complementary to said forming surface of said forming tool and said styling surfaces of said plurality of style line inserts to enable said pressing tool to be used with a forming tool assembly that includes any style line insert of said plurality of style line inserts;
   heating said pressing tool:
   and pressing said heated cover fabric onto said forming tool assembly using said heated pressing tool to provide the desired stylized shape for the trim cover fabric.

6. The method according to claim 1, wherein said "A" surface is the entire front surface of a vehicle seat back.

7. The method according to claim 1, wherein said "A" surface is the entire top surface of a vehicle seat cushion.

* * * * *